Feb. 5, 1963
F. P. ROBBINS
3,076,570
MATERIAL MOVING APPARATUS
Filed April 18, 1960
2 Sheets-Sheet 1
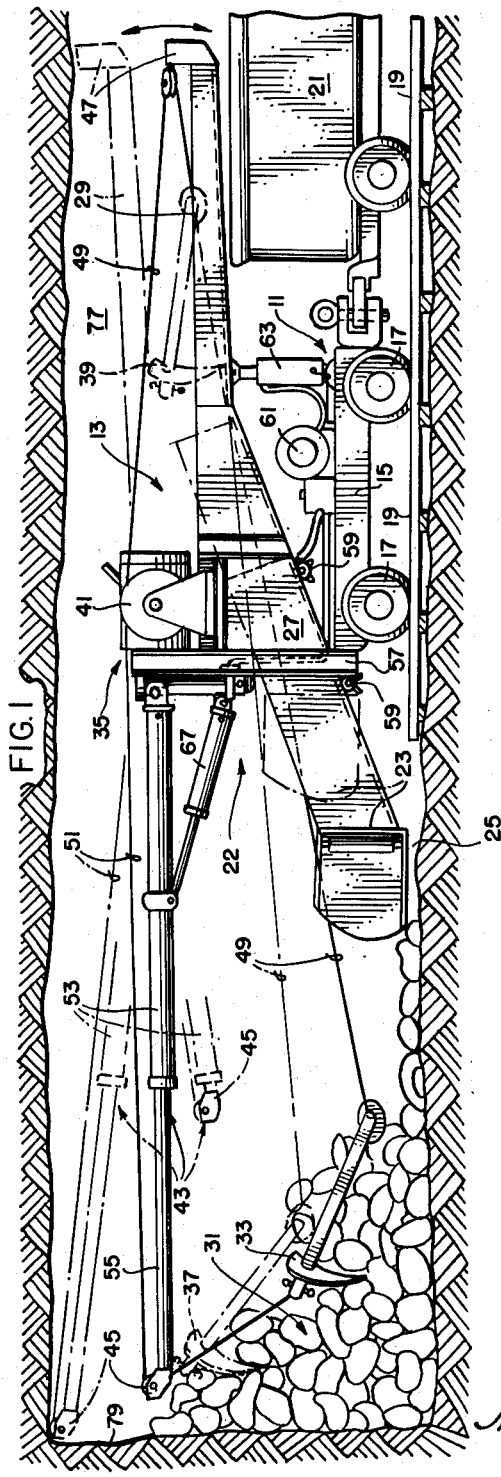
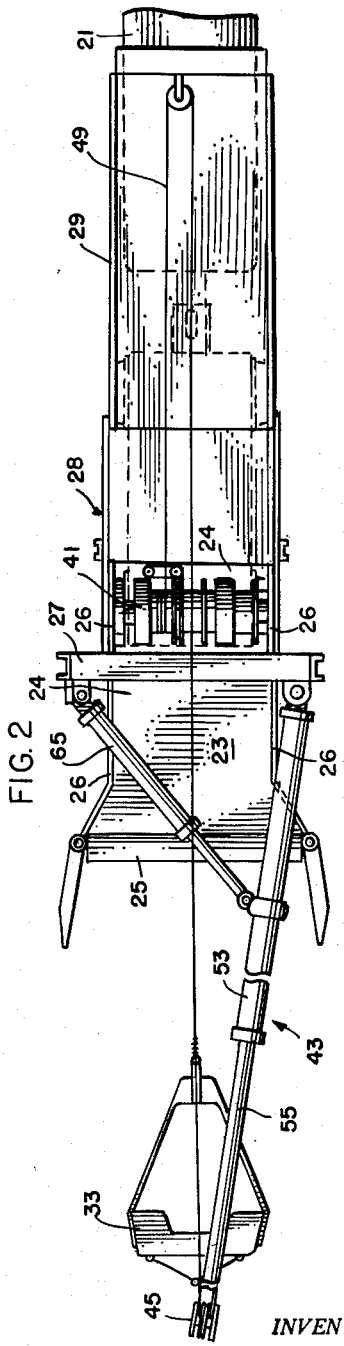
INVENTOR:—
FREDERICK P. ROBBINS
BY:—
Marzall, Johnston, Cook & Root
ATTORNEYS Feb. 5, 1963 F. P. ROBBINS 3,076,570
MATERIAL MOVING APPARATUS
Filed April 18, 1960 2 Sheets-Sheet 2
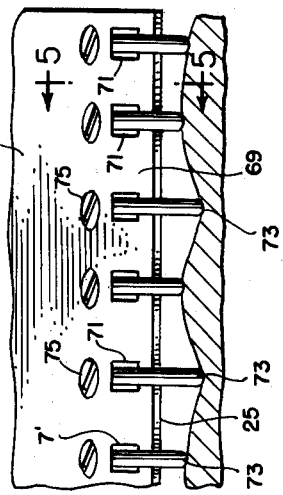
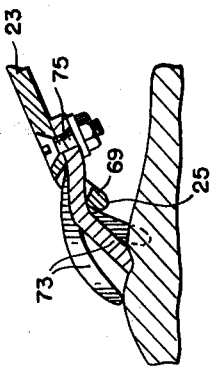
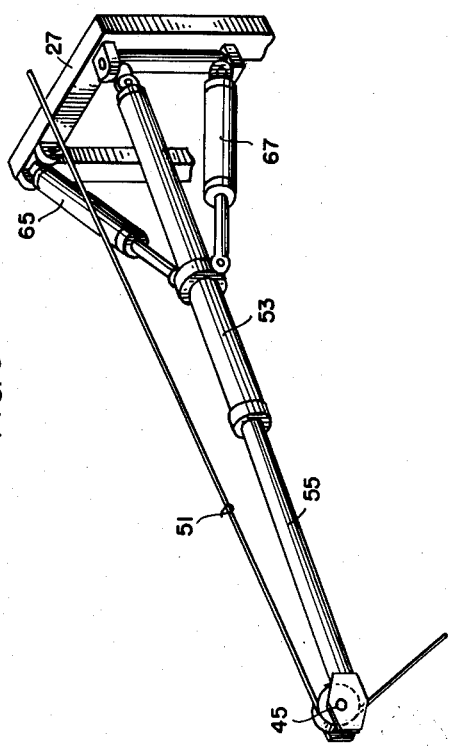
INVENTOR:—
FREDERICK P. ROBBINS
BY:—
Marzall, Johnston, Cook n Root.
ATTORNEYS

United States Patent Office 3,076,570
Patented Feb. 5, 1963

3,076,570
MATERIAL MOVING APPARATUS
Frederick P. Robbins, 224 S. Michigan Blvd.,
Chicago 4, Ill.
Filed Apr. 18, 1960, Ser. No. 22,886
9 Claims. (Cl. 214—110)

The present invention relates in general to apparatus for moving loose material, as by excavating, gathering, conveying and loading or dumping the same, the invention having more particular reference to a slusher or mucking machine for gathering loose material, as by means of a suitable scraper or gathering device, onto a ramp or other suitable elevating means for delivery thence into a receiver, such as a muck car or dump truck.

An important object of the present invention is to provide a mucking machine or slusher embodying a preferably wheeled frame providing an upwardly and rearwardly inclined ramp upon which loose material, such as earth, rocks and the like, may be drawn and elevated in traveling from the front toward the rear of the frame into position to be loaded into a receiver, such as a muck car, the equipment including material moving means operable to an appreciable distance in front of the ramp for slushing material thence rearwardly, as from a muck pile, toward and onto the ramp for delivery thence into the receiver, the material gathering means being carried on an extensible support structure, such as a boom carried by the frame, for vertical as well as horizontal swinging movement, with respect to the ramp structure, to thereby enable the movement of the material gathering means to be guided in desired earth moving paths in front of the ramp structure, so that the material moving means may operate into relatively dangerous areas in front of the ramp structure and its carrying frame, while said structure and frame may remain in relatively secure locations, the apparatus thus being especially suitable for mining operations involving pillar robbing, retreat caving and support withdrawal.

Another important object is to provide a slushing machine embodying an extensible boom swingably mounted for vertical as well as horizontal movement on a ramp structure, the boom at its forward end remote from the ramp structure on which it is mounted carrying a pulley for accommodating a cable connected at one end with earth moving means, such as a slushing scraper, and at the other with a suitable cable drawing hoist, to thereby permit the scraper to be back-hauled away from the ramp structure to a position of maximum extension at the end of the extensible boom, without requiring entry of personnel into the dangerous muck pile area for the purpose of attaching a back-haul pulley, on a suitable support at the muck pile, and the application of the back-haul cable on such pulley prior to the commencement of the slushing operation, as is the conventional procedure, the provision of an extensible boom with end mounted pulley permitting the machine also to accomplish ditching, dredging, cargo hold cleaning, the mucking of sticky gumbo, mucking operations on work benches and slopes, and even the removal of snow, without the delays incident to the mounting and removal of the conventional back-haul pulley, as on the entry face of a work bench.

Another important object is to provide apparatus of the character mentioned in which, by mere reversal of the slushing scraper, the back-filling of material into dangerous areas can be safely and easily accomplished.

Another important object of the invention is to provide the forward edge of a material gathering apron with means for conforming the edge with the uneven or irregular topography of a floor or ground surface upon which the gathering apron may be disposed; a further object being to provide the apron, at its forward, ground engaging edge, with a plurality of resilient, ground conforming or topographic spring fingers in side-by-side, suitably spaced relation along the forward edge of the apron; a still further object being to employ topographic fingers comprising steel leaf springs.

Another important object is to provide a material gathering and elevating ramp structure having a telescopically extensible portion forming an apron adapted to be projected outwardly, at the front end of the ramp structure, into snug engagement with the ground or floor upon which the structure is disposed, so that, wherever the device is located, the forward edge of the apron may be engaged as snugly as possible with the ground or floor to facilitate the gathering of material upon the apron over its forward edge and to minimize the possibility of engagement of a gathering scraper with the forward or ground engaging edge of the apron.

Another important object is to provide for adjustably tilting a material gathering and elevating ramp upon its support frame, in order to aid in pressing the forward edge of the ramp apron onto the ground or floor on which it is positioned for use, and also to aid in adjusting a scraper supported jib boom carried on the ramp frame in desired position with respect to a muck pile or the entry face of a mining tunnel or bench in which the material handling apparatus may be disposed.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIG. 1 is a view in vertical section through a mining tunnel or bench containing material moving apparatus embodying the present invention and disposed in the tunnel in position for slushing mining muck from a pile of broken material at the working end or entry face of the tunnel;

FIG. 2 is a top plan view of the apparatus shown in FIG. 1;

FIG. 3 is a perspective view of a vertically and horizontally swingable boom forming a portion of the apparatus shown in FIGS. 1 and 2;

FIG. 4 is a fragmentary face view of the forward end of a material gathering apron forming a component of the apparatus shown in FIGS. 1 and 2; and FIG. 5 is a sectional view taken substantially along the line 5—5 in FIG. 4.

To illustrate the invention the drawings show a wheeled carriage 11 and material gathering and moving apparatus 13 mounted on the carriage in position for operation in accordance with the invention. The carriage 11 comprises a frame preferably forming a relatively low, flat platform, the frame being fitted with wheels 17 to facilitate carriage movement from place to place, as on wheel engaging rails 19 forming tracks along which the carriage and the material gathering and moving apparatus may be moved into position for the performance of its gathering and material moving function at a pile of muck or other material to be moved. If desired, the carriage 11 may be provided with motive means to constitute the carriage as a self-propelled or automotive vehicle; or other means may be employed for moving the carriage. The tracks formed by the rails 19 may also be used for the support of a material receiver, such as a wheeled car 21, which may be disposed immediately behind the carriage 11 in position to receive material from the apparatus 13.

The apparatus 13 preferably comprises material gathering and elevating means 22 mounted on the carriage 11 and having gathering means extending forwardly of the carriage in position to receive material therein substantially at ground or floor level, the gathering and elevating means extending thence upwardly and rearwardly in the carriage to convey gathered material to an elevated discharge station whence it may be delivered, as by gravity, into the receiver 21. To these ends, the forwardly extending portions of the material gathering and moving means 22 may comprise a material gathering apron or scoop 23 formed with a forward edge 25 adapted to be disposed in position close to or engaging the floor or ground surface as snugly as possible at the place where material is to be gathered.

Rearwardly of its forward edge 25, the apron may comprise a preferably sheet metal trough having an upwardly and rearwardly inclined bottom wall 24 and spaced apart side walls 26 for confining material therebetween and upon the inclined bottom wall. Rearwardly of the apron, the material elevating means may comprise a frame 27 forming a material channel or duct, the same comprising a preferably rectangular, open top sheet metal structure 28 supported on and extending upwardly and rearwardly of the carriage 11, the bottom of said duct forming a continuation of the inclined bottom wall of the apron or scoop 23. At its upper or rearwardly extending end, the channel or duct structure 28 may be formed with a delivery trough 29, the same extending substantially horizontally and rearwardly of the carriage 11 in position overlying the material receiver 21, said delivery trough, at its forward end, being preferably integrated with the channel or duct structure 28, and being formed at its rearward end with a delivery opening through which material may be discharged into the receiver 21.

In order to gather material, as from a muck pile 31, onto the apron 23 and to deliver the material thence through the channel or duct structure 28 and the trough 29 into the receiver 21, a material slushing scraper 33 may be employed in conjunction with scraper drawing and retracting mechanism 35, such mechanism being operable to retract the scraper to material gathering position 37, in the pile of material 31 forwardly of the apron or scoop 23, and then to move the scraper with gathered material, from its said retracted position, toward and onto the apron, and thence on the inclined frame 27 and into the delivery trough 29, to thereby discharge material into the receiver 21, the scraper moving mechanism being then operable to back-haul the scraper from its material delivering position in the trough 29 to the fully retracted gathering position 37 at the material pile 31.

To these ends, the scraper moving mechanism 35 may conveniently comprise a motor driven hoist 41 mounted in any suitable, preferred or convenient location, as on the frame 27, said hoist preferably embodying a pair of cable winding drums and reversible, preferably electrically energized motive means for driving the drums. The scraper moving mechanism also preferably comprises a carriage mounted boom 43 supported at one end, as on the carriage mounted frame 27, and extending thence in position to present its carriage remote end forwardly and outwardly of the apron or scoop 23 and above the retracted material gathering position 37 of the scraper, a back-haul pulley 45 being mounted at the carriage remote end of the boom. A fore-haul pulley 47 may be supported at the rearwardly extending end of the delivery trough 29, the front and rear ends of the scraper 33 being drivingly connected with the winding drums of the hoist by means of fore and back-haul cables 49 and 51 respectively passing around the pulleys 47 and 45, the scraper remote ends of said cables being windingly connected with the drums of the hoist 41.

The boom 43 preferably comprises telescopic sections including a base section 53 supported on the carriage mounted frame and an end section 55 having telescopic relationship with respect to the base section and carrying the back-haul pulley 45 at the outer end of the extensible section 55, the base section 53 being preferably mounted on the frame 27 for vertical and horizontal swinging movement with respect to the frame, as shown more particularly in FIG. 2 of the drawings.

An important feature of the present invention resides in pivotally mounting the material gathering and elevating means 22 for limited angular adjustment about a horizontal axis 57. Such rocking adjustment may be employed to raise the ground engaging edge 25 of the apron 23 from contact with the floor or ground, in order to permit the equipment to be transported, as on the rails 19; and, when the apparatus has been disposed in a working location, the structure 22 may be tilted in order to bring the forward edge 25 of the apron into snug engagement with the floor or ground surface.

Another important feature of the present invention resides in forming the gathering apron or scoop 23 as a component separate from and having sliding telescopic relationship with respect to the channel or duct forming structure 28 of the frame 27 and to provide spur gears 59 on the frame 27 for adjustably sliding the trough portion of the gathering scoop within the material elevating channel or duct structure 28 of the frame 27, between positions of maximum retraction and extension, as illustrated respectively in broken and solid lines in FIG. 1 of the drawings.

While any suitable, preferred or convenient means may be provided for extending and retracting the boom section 55, for swinging the boom horizontally and vertically on the frame 27, for tilting the material gathering and elevating means 22 about the rocking axis 57, and for operating the scoop retracting and projecting gears 59, the present invention contemplates the use of hydraulic driving devices for such purposes. Accordingly, a hydraulic pump 61 and its preferably electrically energized driving motor may be mounted upon the carriage 11 and connected in appropriate hydraulic piping circuits, including suitable control valves for the selective operation of hydraulic piston motors 63, 65 and 67 connected respectively for tilting the material gathering and elevating structure 22, for swinging the boom on the frame 27 about a horizontal as well as about a vertical axis, and for telescopically projecting and retracting the movable boom section 55, as well as for actuating the apron projecting and retracting gears 59.

Another important feature of the invention resides in the provision of means for conforming the forward ground engaging edge of the apron or scoop 23 with a rough or uneven surface. To this end, as shown more particularly in FIGS. 4 and 5, the forward edge 25 of the apron may be curved downwardly as shown at 69, and a series of equally spaced apart openings 71 may be formed along and immediately inwardly of said edge along said line of curvature. A plurality of resilient topographic fingers, preferably comprising steel leaf springs, may be secured in spaced relation along the edge 25 of the scoop in position projecting forwardly thereof, said fingers being slightly curved, as shown in FIG. 5, and each extending upwardly through a corresponding opening 71, so that said fingers, forwardly of said openings, lie in the plane of and form ground engaging extensions of the apron. The butt ends of the spring fingers rearwardly of the openings 71 may underlie the apron and may be secured thereto in any convenient fashion, as by means of screw bolts 75 and associated nuts.

It will be seen that, as the forward edge of the apron is pressed downwardly upon a floor or ground surface, the spring fingers 73 will yield in conformity with the topography of the ground surface or floor upon which pressed and will therefore aid in guiding, onto the apron, the material drawn thereto by the scraper 33, said fingers also serving to prevent the forward edge of the apron from snagging and hence interfering with the movement of the scraper onto the apron.

The device of the present invention eliminates the time and labor consuming necessity of mounting fore and back-haul pulley blocks upon stationary supports, such as the wall faces of mining tunnels in which the equipment may be disposed for slushing operations. In this connection, it is and heretofore has been conventional, in setting up for scraper slushing operations in mine tunnels, such as the tunnel 77 as shown in FIG. 1 of the drawings, to first secure a back-haul pulley block upon the entry face 79, that is to say, the working end of the tunnel, and then to string the back-haul cable through the mounted pulley block for connection with the scraper, it being also customary to mount a fore-haul pulley block upon a tunnel wall or abutment pillar or any other convenient stationary support for the accommodation of the fore-haul cable. Only after fore and back-haul pulleys have been thus mounted in operating position is it possible, in accordance with prevailing practice, to slush material from a muck pile at the entry face of the tunnel rearwardly to a carloading location where the slushed material may be loaded onto material receiving means, as by shovel or other loading means.

A major advantage deriving from apparatus embodying the present invention is its ability to work into unsafe areas, as at or adjacent the entry face of a mine tunnel, from relatively secure zones spaced appreciably away from and behind the dangerous working area. In mining, the operations of robbing ore and pillars in retreat caving, support withdrawal and "heavy ground" procedures may all be performed without entry into danger zones for the preliminary placement of back-haul pulley blocks and other make-ready operations required by current conventional slushing procedures. The mobility, relatively low silhouette design of the apparatus, its lightness and work versatility render it useful for ditch scraping, for dredging submerged areas, for working sticky muck material, for cleaning and leveling cargo in holds, for working of muck benches and slopes, end even for the removal of snow without make-ready or set-up and dismantling or set-down time and labor. By reversing the scraper on the haul lines, backfilling into dangerous zones from relatively safe areas may be easily accomplished. The trimming of bulk cargo in ships or other storage zones may also be readily accomplished without requiring expensive set-up and take-down procedures.

Apparatus embodying the present invention may also be used for standard "transport" slushing by reeving the fore-haul cable 49 in a stationary pulley block suitably mounted at the readily accessible fore-haul end of the mucking operation, while using the boom mounted pulley 45 for guiding the back-haul cable 51 in the inaccessible or dangerous end of the operation.

Apparatus embodying the present invention allows use of a rugged, low cost scraper-loader to achieve mechanical mobility and to provide a dominant means of handling muck under ground in mining operations. The back-haul pulley 45, being mounted upon the hydraulically powered, mechanically positionable, extensible boom 43, may be quickly and easily disposed in any desired position forwardly of the gathering apron or scoop 23. As a consequence, the entrance of operating personnel into dangerous or relatively inaccessible headings, as for example, at the entry face of a mining tunnel where blasting has occurred in producing a muck pile of material requiring removal, is no longer required to mount a back-haul pulley block above the muck pile. It is merely necessary to advance the equipment carriage in the relatively safe zone sufficiently to project the pulley carrying end of the boom into desired position above the muck pile, the hydraulic boom swinging devices 65 and 67, and the telescopic extensibility of the boom section 55 materially aiding in positioning the back-haul pulley in any desired position laterally of the muck pile and at any desired elevation above it. The scraper 33 may thus be applied, at will, at any desired locus in the muck pile 31, such back-haul maneuverability allowing heretofore impossible control of the bite of the scraper in the muck pile, and allowing the scraper even to work into and clean out the front corners of a muck pile at the opposite sides of a tunnel entry face 79, as clearly shown in FIG. 2.

The adjustably extensible apron or scoop 23, together with the tiltably supported frame 27 affords great flexibility in applying the forward end of the scoop into snug engagement with the ground or floor surface upon which the apparatus is disposed for operation, thereby assuring conformity of the spring fingers 73 with the topography of ground surface irregularities and facilitating the delivery of material to the gathering and elevating means 22. By maintaining the rear end of the delivery trough 29 as low as possible, the inclination of the frame 27 is reduced, thereby minimizing loading stresses.

The expensive mass required in bulldozing traction loaders is not required in apparatus embodying the present invention. The great wearing and tearing strains encountered in conventional shuttle loading equipment are entirely absent in the here disclosed apparatus of the present invention, which, consequently, comprises a relatively lightweight, simple mechanism providing high ton-foot loading capacity per dollar of cost.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus for moving loose material comprising a support frame forming a carriage adapted for disposition adjacent a pile of material to be moved, a material receiving and elevating structure on and inclined upwardly and rearwardly of said support frame, said structure including a gathering apron extending forwardly and downwardly of the support frame, a material elevating ramp connected with said apron and extending upwardly and rearwardly thereof, said apron being shiftable longitudinally of said ramp, a delivery trough connected with the upper portions of said ramp and extending rearwardly thereof in position to deliver material from the ramp to a receiving station beneath said delivery trough, conveyor means supported on said carriage and operable to gather material from said pile and deliver the same onto said apron and up said ramp to said trough for discharge thence to said receiving station, and means operable to shift the apron on the ramp in a direction to press its forward edge snugly against the ground or floor surface upon which the apparatus is positioned for operation.

2. Apparatus for moving loose material comprising a support frame forming a carriage adapted for disposition adjacent a pile of material to be moved, a material receiving and elevating structure on and inclined upwardly and rearwardly of said support frame, said structure including a gathering apron extending forwardly and downwardly of the support frame, a material elevating ramp connected with said apron and extending upwardly and rearwardly thereof, a delivery trough connected with the upper portions of said ramp and extending rearwardly thereof in position to deliver material from the ramp to a receiving station beneath said delivery trough, and conveyor means supported on said carriage and operable to gather material from said pile and deliver the same onto said apron and up said ramp to said trough for discharge thence to said receiving station, said gathering apron being slidable on and with respect to said ramp to thereby press the forward edge of said apron snugly upon the floor or ground surface upon which the apparatus is positioned for operation.

3. Apparatus for moving loose material comprising a support frame forming a carriage adapted for disposition adjacent a pile of material to be moved, a material receiving and elevating structure on and inclined upwardly and rearwardly of said support frame, said structure including a gathering apron extending forwardly and downwardly of the support frame, a material elevating ramp connected with said apron and extending upwardly and rearwardly thereof, a delivery trough connected with the upper portions of said ramp and extending rearwardly thereof in position to deliver material from the ramp to a receiving station beneath said delivery trough, conveyor means supported on said carriage and operable to gather material from said pile and deliver the same onto said apron and up said ramp to said trough for discharge thence to said receiving station, and resilient means on said gathering apron at its forward edge to conform the same with the topography of the ground or floor surface upon which the same may be pressingly applied, to aid in the delivery of material onto said apron over its forward ground engaging edge.

4. Apparatus for moving loose material comprising a support frame forming a carriage adapted for disposition adjacent a pile of material to be moved, a material receiving and elevating structure on and inclined upwardly and rearwardly of said support frame, said structure including a gathering apron extending forwardly and downwardly of the support frame, a material elevating ramp connected with said apron and extending upwardly and rearwardly thereof, a delivery trough connected with the upper portions of said ramp and extending rearwardly thereof in position to deliver material from the ramp to a receiving station beneath the delivery trough, conveyor means supported on said carriage and operable to gather material from said pile and deliver the same onto said apron and up said ramp to said trough for discharge thence to said receiving station, and resilient spring fingers mounted on said apron in position extending outwardly of its forward edge in position to engage and yieldingly conform with the topography of the floor or ground surface upon which the forward edge of the apron may be pressed, in order to facilitate the delivery of material onto the apron over its said forward edge.

5. Apparatus for moving loose material comprising a support frame forming a carriage adapted for disposition adjacent a pile of material to be moved, a material receiving and elevating structure on and inclined upwardly and rearwardly of said support frame, said structure including a gathering apron extending forwardly and downwardly of the support frame, a material elevating ramp connected with said apron and extending upwardly and rearwardly thereof, a delivery trough connected with the upper portions of said ramp and extending rearwardly thereof in position to deliver material from the ramp to a receiving station beneath said delivery trough, a telescopically extensible support boom on said carriage and extending above and forwardly of said apron and carrying a pulley in position to be disposed above said pile of material, hydraulic means for longitudinally extending and retracting the boom in front of said carriage, above said apron, and conveyor means supported on said carriage and operable to carry material from said pile and deliver the same onto said apron and up said ramp to said trough for discharge thence to said receiving station, said conveyor means embodying a slushing scraper and a back-haul dragline carried on said boom mounted pulley and operable to retract the scraper to a material gathering position in said pile.

6. Apparatus for moving loose material as set forth in claim 5, wherein said boom is mounted on the support frame for swinging movement in a horizontal plane about a vertical axis, and hydraulically actuated means on said frame operable to control the swinging movement of the boom.

7. Apparatus for moving loose material as set forth in claim 5, wherein said boom is mounted on the support frame for swinging movement in a vertical plane about a horizontal axis, and hydraulically actuated means on said frame operable to control the swinging movement of the boom.

8. Apparatus for moving loose material as set forth in claim 5, wherein said boom is mounted on the support frame for swinging movement in a vertical plane about a horizontal axis and in a horizontal plane about a vertical axis, and hydraulically actuated means on said frame operable to control the swinging movement of the boom about the vertical and horizontal axes.

9. Apparatus for moving loose material comprising a wheeled support frame forming a carriage adapted for movement toward and into operating position adjacent a pile of material to be moved, a material receiving and elevating structure including a ramp rockingly supported on said frame in position inclined upwardly and rearwardly thereof, a gathering apron on said ramp and extending forwardly and downwardly of the support frame, said apron being shiftable longitudinally of said ramp, a delivery trough connected with the upper portions of said ramp and extending rearwardly thereof in position to deliver material from the ramp to a receiving station beneath said delivery trough and behind said wheeled frame, a hoist comprising controllable motor driven, line winding drum means supported on said wheeled carriage, a telescopically extensible boom mounted on and extending forwardly of said wheeled carriage and above said gathering apron, hydraulic means for longitudinally extending and retracting the boom and for swinging it horizontally on and in front of said carriage, above said apron, a back-haul dragline pulley supported on said boom outwardly of the forward edge of said apron, a fore-haul dragline pulley mounted on said wheeled frame rearwardly of said hoist, a material slushing scraper, and draglines connected with the front and rear of said scraper and respectively reeved upon said fore and back-haul pulleys, said lines being windingly connected on the drum means of said hoist.

References Cited in the file of this patent

UNITED STATES PATENTS

| | | |
|---|---|---|
| 2,051,629 | Yannes | Aug. 18, 1936 |
| 2,123,909 | Osgood et al. | July 19, 1938 |
| 2,268,586 | Cook | Jan. 6, 1942 |
| 2,781,140 | Cryderman | Feb. 12, 1957 |

FOREIGN PATENTS

| | | |
|---|---|---|
| 63,544 | France | Sept. 29, 1955 |
| | (Addition to No. 1,054,709) | |
| 1,009,107 | Germany | May 23, 1957 |